(12) United States Patent
Krishnamurthy

(10) Patent No.: US 11,854,285 B2
(45) Date of Patent: Dec. 26, 2023

(54) NEURAL NETWORK ARCHITECTURE FOR EXTRACTING INFORMATION FROM DOCUMENTS

(71) Applicant: UST Global (Singapore) Pte. Ltd., Singapore (SG)

(72) Inventor: Dasaprakash Krishnamurthy, Chennai (IN)

(73) Assignee: UST Global (Singapore) Pte. Ltd., Singapore (SG)

( * ) Notice: Subject to any disclaimer, the term of this patent is extended or adjusted under 35 U.S.C. 154(b) by 294 days.

(21) Appl. No.: 17/316,318

(22) Filed: May 10, 2021

(65) Prior Publication Data

US 2022/0230013 A1 Jul. 21, 2022

(30) Foreign Application Priority Data

Jan. 21, 2021 (IN) .............................. 202111002935

(51) Int. Cl.
*G06V 30/412* (2022.01)
*G06N 3/08* (2023.01)
*G06V 30/413* (2022.01)
*G06V 30/40* (2022.01)

(52) U.S. Cl.
CPC ............. *G06V 30/412* (2022.01); *G06N 3/08* (2013.01); *G06V 30/413* (2022.01); *G06V 30/43* (2022.01)

(58) Field of Classification Search
CPC .... G06V 30/43; G06V 30/412; G06V 30/413; G06V 10/82; G06N 3/08
See application file for complete search history.

(56) References Cited

U.S. PATENT DOCUMENTS

| | | | |
|---|---|---|---|
| 10,671,878 B1* | 6/2020 | Sarshogh | G06F 18/217 |
| 2019/0026550 A1* | 1/2019 | Yang | G06V 30/19147 |
| 2019/0156210 A1* | 5/2019 | He | G06F 17/15 |

OTHER PUBLICATIONS

Yang, et al. (Multilevel Features Convolutional Neural Network for Multifocus Image Fusion), pp. 262-273. (Year: 2019).*
Rashid, et al. (Table Recognition in Hetrogeneous Dcoments using Machine Learning), pp. 777-782. (Year: 2017).*

* cited by examiner

*Primary Examiner* — Daniel G Mariam
(74) *Attorney, Agent, or Firm* — Nixon Peabody LLP

(57) ABSTRACT

A system to extract data from regions of interest on a document is provided. The system includes a storage device storing an image derived from a document having text information. The system includes a document importer operable to perform optical character recognition to convert image data in the image to machine readable data. The system includes a neural network that identifies at least one region of interest on the image to classify an area of the at least one region of interest as a table. The neural network is operable to take as input the machine readable data and the image and combine both the machine readable data and the image to determine that the classified area is the table.

20 Claims, 16 Drawing Sheets

Danhop Lotlight LLC.

WEBSITE DEVELOPER

Date : June 18, 2020
Invoice No : 16234
Customer PO : 37865978

GRAND TOTAL

$840

BILL TO :

| | | |
|---|---|---|
| Name | : | Danhop Lotlight LLC. |
| Phone Number | : | +88 12 345 6789 |
| Email | : | ariellanoldekin@gmail.com |
| Address | : | Praesent viera street no. 27 |
| | | West Nulla city |
| | | Dome, 5100 |

PAYMENT DETAILS :

| | | |
|---|---|---|
| Bank Name | : | Ret Everum Bank |
| Account Number | : | 07012020 |
| Account Holder | : | Ariella Moldekin |
| Bank Code | : | PLM8310 |

TERM & CONDITIONS :

- Lorem ipsum dolor sit amet consectetuer adipiscing elit, porttitor congue massa magna sed pulvinar ultricies.
- Lorem ipsum dolor sit amet consectetuer adipiscing elit porttitor congue.
- Lorem ipsum dolor sit amet consectetuer adipiscing elit porttitor congue.

ITEM / SERVICE DETAILS

| DESCRIPTION | QTY | UNIT PRICE | AMOUNT |
|---|---|---|---|
| Item / service description here | 1 | $80 | $80 |
| Item / service description here | 2 | $80 | $160 |
| Item / service description here | 1 | $80 | $80 |
| Item / service description here | 2 | $80 | $160 |
| Item / service description here | 1 | $80 | $80 |
| Item / service description here | 2 | $80 | $160 |
| Item / service description here | 1 | $80 | $80 |

Payment is required by the latest 30 June 2020 at 12pm.
Thank you for your order.

| | |
|---|---|
| SUB-TOTAL | $800 |
| TAX (10%) | $80 |
| DISCOUNT (5%) | $40 |
| GRAND TOTAL | $840 |

Phone : +88 12 345 6789 | Email : yourbrand@gmail.com
Praesent viera street no 27, West Nulla city, Dome 5100
www.yourbrand.com

INVOICE

FIG. 6A

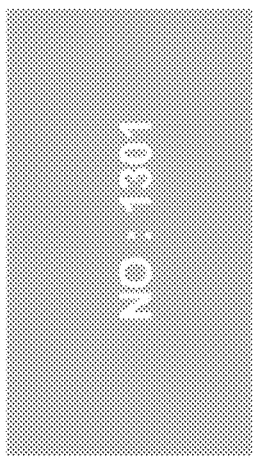

INVOICE

| INVOICE DATE | INVOICE NUMBER | CUSTOMER PO |
|---|---|---|
| April 23, 2019 | 1301 | 8965498879 |

GRAND TOTAL : $660.25

INVOICE TO :

| NAME | CONTACT | ADDRESS |
|---|---|---|
| ABC INC.<br>Company name<br>Supplier Code -- BF786 | +88 12 345 6789<br>Andyecatum@gmail.com | Praesent street no. 27<br>West Nulla city, Dome 5100 |

| NO | Part Number | DESCRIPTION | QTY | PRICE | AMOUNT |
|---|---|---|---|---|---|
| 01 | 180654893 | Description of item / service here | 1 | $90 | $90 |
| 02 | 188096488 | Description of item / service here | 3 | $45 | $135 |
| 03 | 180097453 | Description of item / service here | 2 | $30 | $60 |
| 04 | 181973456 | Description of item / service here | 2 | $55 | $110 |
| 05 | 180573828 | Description of item / service here | 1 | $100 | $100 |
| 06 | 188937329 | Description of item / service here | 5 | $25 | $125 |
| 07 | 180767672 | Description of item / service here | 1 | $75 | $75 |
| | | | | SUB-TOTAL | $695 |
| | | | | TAX (5%) | $34.75 |
| | | | | DISCOUNT (10%) | $69.5 |
| | | | | GRAND TOTAL | $660.25 |

PAYMENT METHOD :

| BANK NAME | ACCOUNT NUMBER | ACCOUNT HOLDER |
|---|---|---|
| Ret Everum Bank | 1718042019 | Debora Consedus |

TERM & CONDITIONS : Auamentiunt undit accus et aut magnis a solorum autas digento con rematum sed estinum hil mo tenit as reet maio blat lacearit temquam voloribus aut magins a solorum.

 ABC INC.

Phone : +88 12 345 6789 | Fax : +82 12 345 6789
Email : yourbrand@gmailcom
Address : Praesent Viera street no. 27, West Nulla city, Dome 5100

FIG. 6C

YOUR BRAND INC.

Praesent Viera street no.27, West Nulla city, Dome 5100
Phone : +88 12 345 6789 | Fax : +82 12 345 6789
Email : yourbrand@gmail.com
www.yourbrand.com

Invoice

May 08, 2019
No.1301

| NAME | : | YOUR BRAND INC. | PAYMENT DUE: | June 08, 2019 |
| ADDRESS | : | Praesent viverra street no.27 | CUSTOMER PO: | 98976775 |
| | | West Nulla city, Dome 5100 | GRAND TOTAL: | $660.25 |
| EMAIL | : | andyecatum@gmail.com | | |

| NO | Part Number | DESCRIPTION | QTY | PRICE | AMOUNT |
|----|-------------|-------------|-----|-------|--------|
| 01 | 188099763 | Description of item / service here | 1 | $90 | $90 |
| 02 | 180965437 | Description of item / service here | 3 | $45 | $135 |
| 03 | 189654390 | Description of item / service here | 2 | $30 | $60 |
| 04 | 187652341 | Description of item / service here | 2 | $55 | $110 |
| 05 | 184562985 | Description of item / service here | 1 | $100 | $100 |
| 06 | 188462987 | Description of item / service here | 5 | $25 | $125 |
| 07 | 180863829 | Description of item / service here | 1 | $75 | $75 |

PAYMENT METHOD

| BANK NAME | : | Ret Everum Bank |
| ACCOUNT NUMBER | : | 1710042019 |
| ACCOUNT HOLDER | : | Debora Consedus |

TERM & CONDITIONS

Auamentiunt undit accus et aut magnis a solorum autas digento con rematum sed estinum hil mo tenit as reet maio blat lacearit temquam voloribus aut magins a maio hil solorum.

| INVOICE TOTAL | |
|---|---|
| SUB TOTAL | $695 |
| TAX (5%) | $34.75 |
| DISCOUNT (10%) | $69.5 |
| GRAND TOTAL | $660.25 |

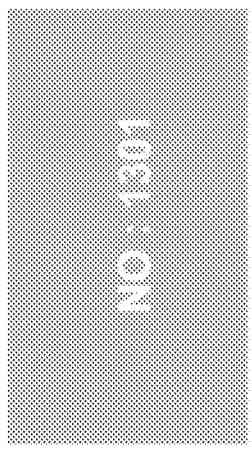

INVOICE

| INVOICE DATE | INVOICE NUMBER | CUSTOMER PO |
|---|---|---|
| April 23, 2019 | 1301 | 8965498879 |

GRAND TOTAL : $660.25

INVOICE TO :

NAME
ABC INC.
Company name
Supplier Code -- BF786

CONTACT
+88 12 345 6789
Andyecatum@gmail.com

ADDRESS
Praesent street no. 27
West Nulla city, Dome 5100

| NO | Part Number | DESCRIPTION | QTY | PRICE | AMOUNT |
|---|---|---|---|---|---|
| 01 | 180654893 | Description of item / service here | 1 | $90 | $90 |
| 02 | 186096488 | Description of item / service here | 3 | $45 | $135 |
| 03 | 180097453 | Description of item / service here | 2 | $30 | $60 |
| 04 | 181973456 | Description of item / service here | 2 | $55 | $110 |
| 05 | 180573828 | Description of item / service here | 1 | $100 | $100 |
| 06 | 188937329 | Description of item / service here | 5 | $25 | $125 |
| 07 | 180767672 | Description of item / service here | 1 | $75 | $75 |

| | |
|---|---|
| SUB-TOTAL | $695 |
| TAX (5%) | $34.75 |
| DISCOUNT (10%) | $69.5 |
| GRAND TOTAL | $660.25 |

722

PAYMENT METHOD :

BANK NAME
Ret Everum Bank

ACCOUNT NUMBER
1718042019

ACCOUNT HOLDER
Debora Consedus

TERM & CONDITIONS : Auamentiunt undit accus et aut magnis a solorum autas digento con rematum sed estinum hil mo tenit as reet maio biat lacearit temquam voloribus aut magins a solorum.

 ABC INC.

Phone : +88 12 345 6789 | Fax : +82 12 345 6789
Email : yourbrand@gmailcom
Address : Praesent Viera street no. 27, West Nulla city, Dome 5100

FIG. 7C

YOUR BRAND INC.
Praesent Viera street no.27, West Nulla city, Dome 5100
Phone : +88 12 345 6789 | Fax : +82 12 345 6789
Email : yourbrand@gmail.com
www.yourbrand.com

Invoice
May 08, 2019
No.1301

| NAME | : | YOUR BRAND INC. | PAYMENT DUE: | June 08, 2019 |
| ADDRESS | : | Praesent viverra street no.27 | CUSTOMER PO: | 98976775 |
| | | West Nulla city, Dome 5100 | GRAND TOTAL: | $660.25 |
| EMAIL | : | andyecatum@gmail.com | | |

| NO | Part Number | DESCRIPTION | QTY | PRICE | AMOUNT |
|----|-------------|-------------|-----|-------|--------|
| 01 | 188099763 | Description of item / service here | 1 | $90 | $90 |
| 02 | 180965437 | Description of item / service here | 3 | $45 | $135 |
| 03 | 189654390 | Description of item / service here | 2 | $30 | $60 |
| 04 | 187652341 | Description of item / service here | 2 | $55 | $110 |
| 05 | 184562985 | Description of item / service here | 1 | $100 | $100 |
| 06 | 188462987 | Description of item / service here | 5 | $25 | $125 |
| 07 | 180863829 | Description of item / service here | 1 | $75 | $75 |

732

PAYMENT METHOD
BANK NAME : Ret Everum Bank
ACCOUNT NUMBER : 1710042019
ACCOUNT HOLDER : Debora Consedus

TERM & CONDITIONS
Auamentium undit accus et aut magnis a solorum autas digento con rematum sed estinum hil mo tenit as reet maio blat lacearit temquam voloribus aut magnis a maio hil solorum.

| INVOICE TOTAL | |
|---|---|
| SUB TOTAL | $695 |
| TAX (5%) | $34.75 |
| DISCOUNT (10%) | $69.5 |
| GRAND TOTAL | $660.25 |

FIG. 7D

NEURAL NETWORK ARCHITECTURE FOR EXTRACTING INFORMATION FROM DOCUMENTS

PRIORITY CLAIM

This application claims priority to India Provisional Application No. 202111002935, filed Jan. 21, 2021, which is hereby incorporated by reference herein in its entirety.

FIELD

The present disclosure relates generally to a data extraction system, and more specifically, to a method and system to allow efficient extraction of specific information from scanned documents that include tables.

BACKGROUND

There is an increasing need to easily obtain data from scanned images of documents. For example, many documents such as invoices are still in paper form, but must be converted to electronically accessible form. In order to access the data electronically, manual labor is usually employed to key in data from physical documents or images of such documents. Such methods are time consuming and may suffer from accuracy due to human error in keying in data.

Optical character recognition (OCR) technology allows text data to be translated automatically from text images on scanned documents. However, all data on a document image, including irrelevant data, will be produced by an OCR process. Thus, human intervention is still required to properly determine relevant data from the OCR produced data. When such data is extracted and cleaned up after the OCR process, a text search from the extracted data may be performed to determine the relevant data. This process is also error prone because the OCR cannot properly format data that is oriented in anything but horizontal lines in a document.

For example, many companies receive scanned copies of different types of invoices, which prevents them from using a normal text search to extract information. Because each vendor invoice has a different template and layout, the information will be present in different locations or regions on the scanned document. For example, two different invoices may have the same information, but such details like the invoice number, the date, the total amount, etc. are in different locations on the document. Thus, pre-defined rules cannot be used to reliability extract information from invoices because of the differences in format.

Conventional machine learning techniques for document extraction usually require thousands of example documents as training data. The example documents must include "right answers" at specific locations on the page, such that specific document layouts and information can be learned. A huge amount of training data will ensure that changes in layout, or minor departures from the layout can be recognized by the conventionally trained machine learning models. Drawbacks to having a huge amount of training data include costs associated with preparing the training data (e.g., annotating locations of tables or fields of interests in example documents). For supervised learning, economic costs associated with the training can increase drastically as the number of example documents increases.

Other techniques have been proposed to reduce the number of example documents. For example, zero shot learning has been proposed. Zero shot learning tends to incur high hardware costs. Also performance and accuracy associated with zero shot learning tends to degrade linearly with the number of fields being extracted. Zero shot learning also tends to rely heavily on preprocessing and domain specific knowledge of the documents being extracted.

Thus, there lies at least a need for a system that allows efficient extraction of relevant data from a document image. There is also a need for a system that allows identification of regions of interest on a document for further classification. There is also a need for a system that employs machine learning to determine image features (e.g., tables) that define probable areas of a document containing needed information with limited number of training data.

SUMMARY

One disclosed example is document extraction system for extracting data from an invoice. The invoice can be a scanned image and can be in any format. This is especially useful in cases where the system is expected to process invoices from different vendors and hence cannot follow a standard format.

According to some implementations of the present disclosure, a system for extract data from regions of interest on a document is provided. The system includes a storage device, a document importer, and a neural network. The storage device stores an image derived from a document having text information. The document importer is operable to perform optical character recognition to convert image data in the image to machine readable data. The neural network identifies at least one region of interest on the image to classify an area of the at least one region of interest as a table. The neural network takes in as input the machine readable data and the image and combines both the machine readable data and the image to determine that the classified area is the table.

According to some implementations of the present disclosure, a method for extracting data from regions of interest from a document is provided. The method includes (a) creating an image of the document, (b) storing the image of the document in a storage device, (c) converting the image to machine readable data using optical character recognition of a data importer, (d) identifying at least one region of interest from the image using a neural network, and (e) classifying an area of the at least one region of interest as a table.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 6A is an example invoice with a bordered table;

FIG. 6C is an example invoice with a table without column boundaries;

FIG. 6D is an example invoice with a bordered table;

Figure 7B:
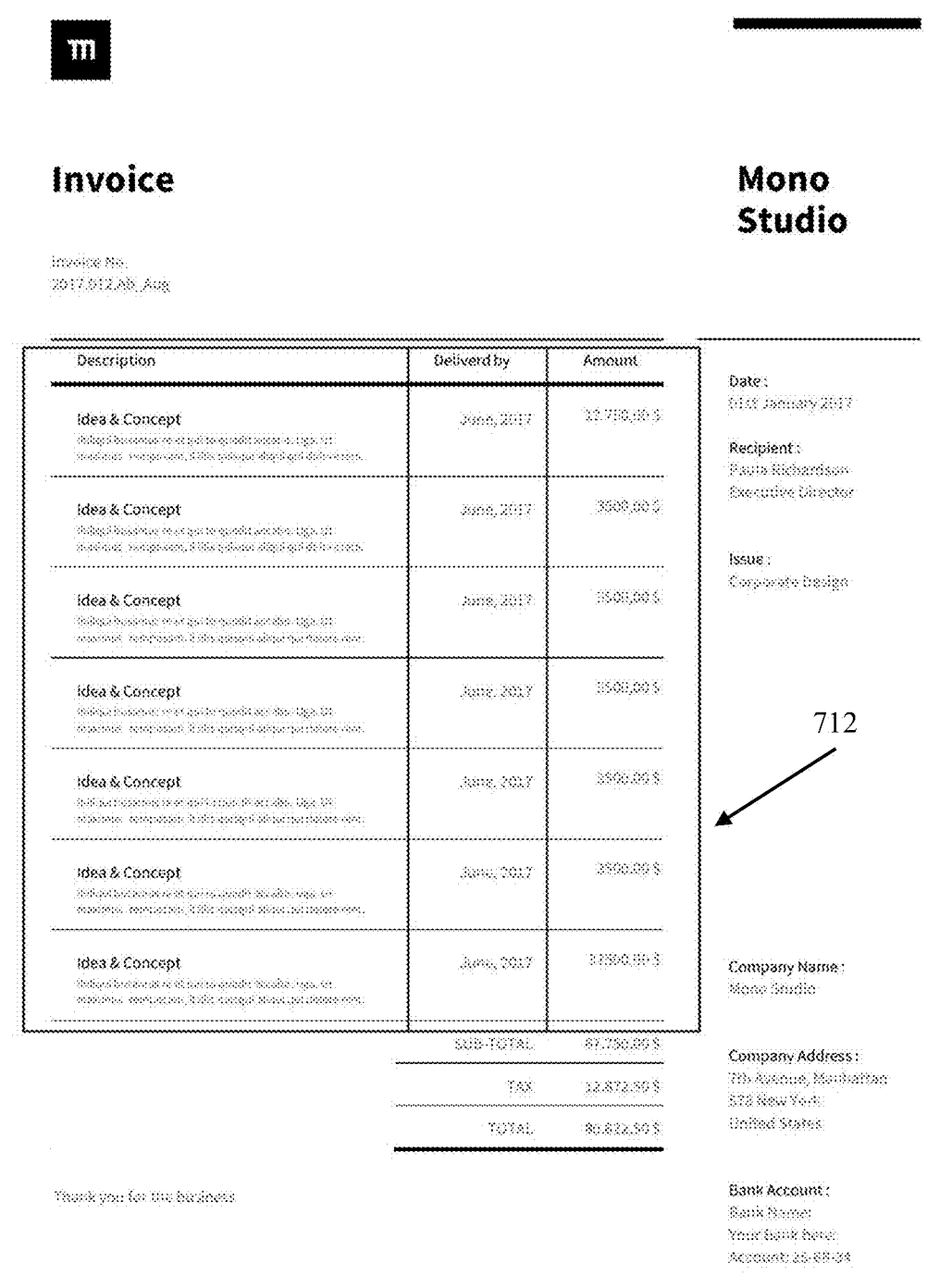

FIG. 7B is the example invoice of FIG. 6B with the table identified;

FIG. 7C is the example invoice of FIG. 6C with the table identified;

FIG. 7D is the example invoice of FIG. 6D with the table identified;

Figure 1:
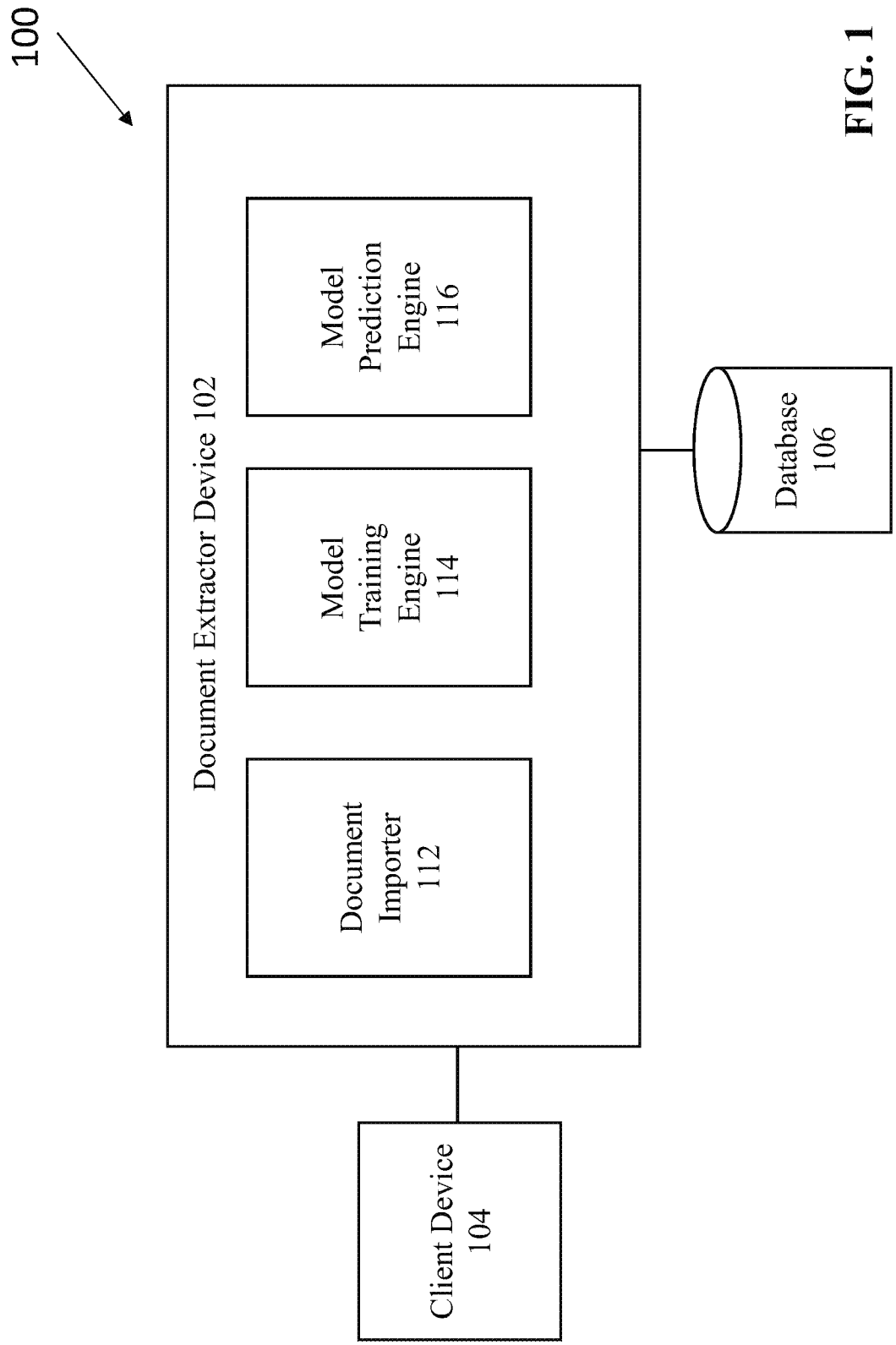
FIG. 1 is a block diagram of an example document data extraction system.

The present disclosure is susceptible to various modifications and alternative forms. Some representative embodiments are shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE
ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclose relates to a system that extracts key information from the image of any document such as an invoice. The system does not depend on reading the text in the image or the position of the text in the document so that the current challenges of extracting certain information from documents are overcome. While the examples disclosed herein focus on invoices, the present disclosure is not limited to invoices, but rather, is more broadly applicable to any documents having similarly arranged information as invoices, such as credit card agreements, and other documents having information arranged in tables, and particularly where the information or content on the document appears in different positions and arrangements or layouts for different creators or authors of the documents.

Conventional machine learning systems for document extraction have drawbacks in terms of amount of data required and availability of the required data. It is unclear how much data is required for training, and if the data available for training does not provide a good enough performance, data availability can hamper further training and hamper accuracy of the system. Conventional machine learning systems also must consider performance (i.e., number of documents that can be processed per unit time), hardware infrastructure (i.e., speed of components of the computing systems), productivity tools (e.g., ability to receive human feedback), and amount of specific domain knowledge required. Machine learning systems geared towards a first domain are not versatile to being applied to a second domain without training the systems to handle the second domain.

Table detection and extraction is a challenging problem in the intelligent document processing space. This space includes, e.g., insurance forms, purchase orders, invoices, receipts, contract tables, etc., where documents of different templates, image sizes, resolutions and qualities must be extracted. Tables are typically present in these documents. The tables can be provided with or without: (a) row/column borders, (b) small/dark/noisy headers, (c) information spanning across multiple columns, (d) table line items spanning across multiple rows, or (e) any combination thereof. While conventional approaches can tackle table detection, table extraction still remains a challenge. Thus, embodiments of the present disclosure provide end-to-end table detection and extraction from images using deep learning and image enrichment with few-shot learning. Embodiments of the present disclosure use deep learning, context awareness, image enrichment and post-processing for document extraction. Embodiments of the present disclosure use few-shot learning and do not require rules or heuristics to perform the table detection and extraction. Few shot learning can use as few as 100 documents for training and can evaluate over 500 documents from different domains.

FIG. 1 illustrates a block diagram of an example document data extraction system 100 according to some implementations of the present disclosure. To simplify discussion, the singular form will be used for components identified in FIG. 1 when appropriate, but the use of the singular does not limit the discussion to only one of each such component. The system 100 includes a client device 104, a document extractor device 102, and a database 106. Each of these components can be realized by one or more computer devices and/or networked computer devices. The computer devices include at least one processor with at least one non-transitory computer readable medium.

The client device 104 is any computing device that can provide commands to or that can communicate with the document extractor device 102 to request the document extractor device 102 perform information extraction. The client device 104 can also provide the document extractor device 102 one or more document images for information extraction. Examples of the client device 104 include a laptop computer, a desktop computer, a smartphone, a smart speaker, a smart television, a scanner, a PDA, etc.

The document extractor device 102 can use the database 106 for storage. For example, model parameters for the machine-learned model can be stored in the database 106, scanned document images can be stored in the database 106, document extraction settings can be stored in the database 106, preconfigured document formatting settings can be stored in the database 106, etc.

The document extractor device 102 can include a document importer 112, a model training engine 114, and a model prediction engine 116. An engine is a combination of hardware and software configured to perform specific functionality. The document extractor device 102 is configured to receive instructions from the client device 104 for extracting information from one or more documents. For example, the client device 104 can provide the document extractor device 102 with a copy of a company's annual report, and the document extractor device 102 can analyze the annual report document to extract fields (such as, chief executive officer (CEO), company name, total assets, etc.). In some implementations, the document extractor device 102 does not have to know the type of document being examined. Each of the document importer 112, model training engine 114, and the model prediction engine 116 identified in FIG. 1 is a combination of hardware and software configured to perform specific functionality as described in the following paragraphs.

In some implementations, the document extractor device 102 includes the document importer 112. The document importer 112 is configured to interrogate documents to be examined based on file format. The documents can be provided in different file formats. For example, the documents can be provided in text format (e.g., as a text file, as a hypertext markup language file (HTML), etc.), in an image format (e.g., portable network graphics (PNG) format, tagged image file format (TIFF), Silicon Graphics image file (RGB), graphic interchange format (GIF), portable bitmap formats (e.g., PBM, PGM, PPM), Sun raster bitmap image file format (RAST), raster image file formats (e.g., EXR), JPEG, bitmap formats (e.g., BMP, XBM), etc.), in a video format (e.g., WebP file format), or in any other document format (e.g., portable document format (PDF), open document format (ODF), Microsoft® Word document (DOC), Microsoft® Word Open XML format (DOCX), etc.). The document importer 112 can include OCR for recognizing text in image files.

The model training engine 114 trains a machine learning model using training data. The model prediction engine 116 uses the trained machine learning model to provide information in documents to the client device 104. For example, the model training engine 114 can receive training documents from the document importer 112 to train the model, and model prediction engine 116 can receive documents from the document importer 112 for extracting information using the trained model.

Figure 2:
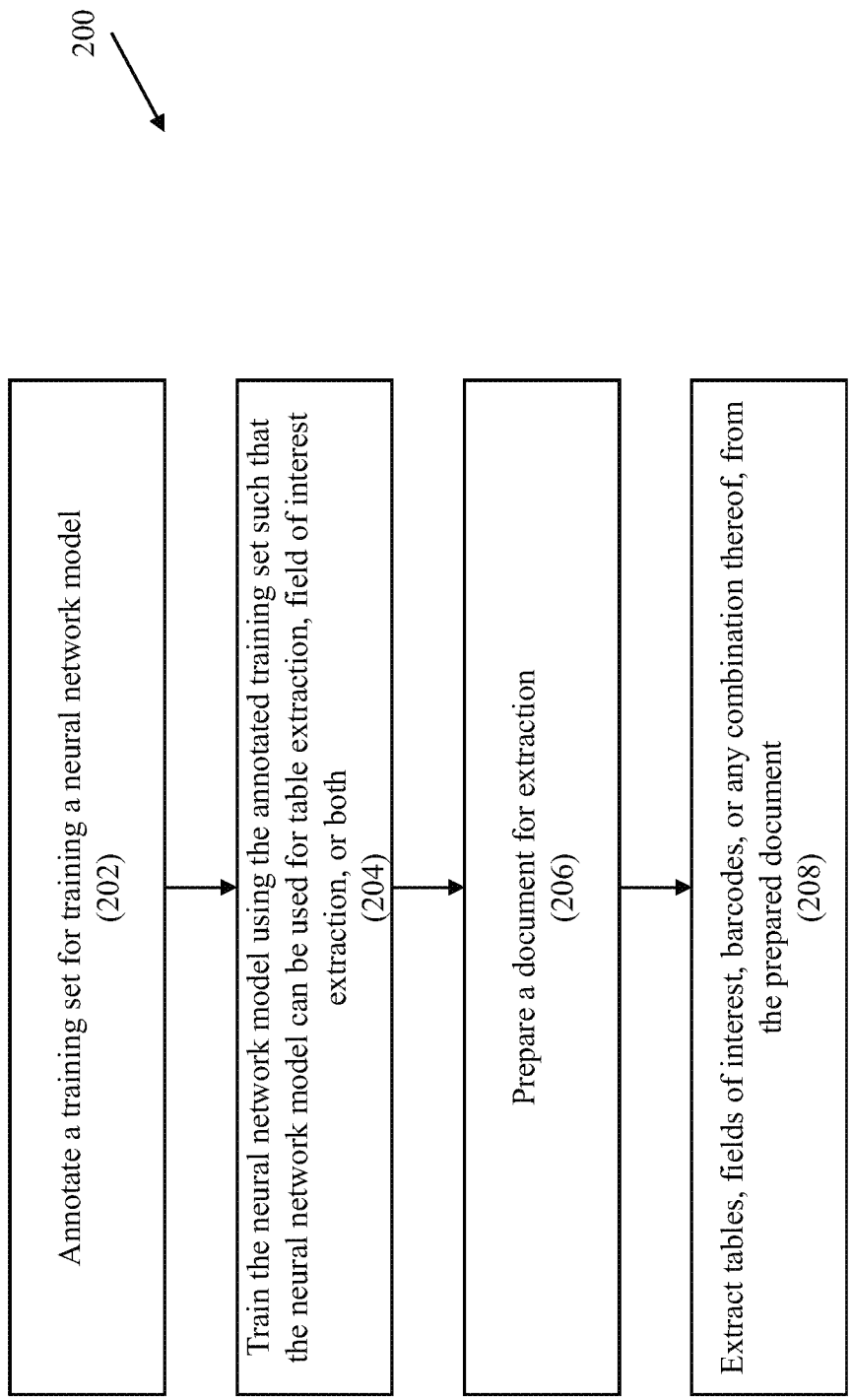
FIG. 2 is a flow diagram showing the process of learning relevant information from a training set and extracting information from a document, according to some implementations of the present disclosure.

FIG. 2 is a flow diagram showing a process 200 of learning relevant information from a training set and extracting information from a document, according to some implementations of the present disclosure. The steps in FIG. 2 can be implemented by the client device 104, the document extractor device 102, or both. At step 202, the client device 104, in cooperation with the document extractor device 102, can annotate a training set for training a neural network model. The training set can include document images. For example, a document image of the training set can include a table. The table can be annotated to indicate a header of the table. The table can be annotated by identifying columns, rows, etc. The columns and rows can be identified using different colors.

At step 204, the document extractor device 102 trains the neural network model using the annotated training set such that the neural network model can be used for table extraction, field of interest extraction, bar code extraction, etc. In some implementations, the neural network model being trained is a convolutional neural network (CNN), and training involves adjusting weights of the CNN. The model training engine 114 can iteratively adjust weights associated with the CNN such that the document extractor device 102 can extract information (e.g., fields of interest) from documents.

At step 206, the document extractor device 102 prepares a document for extraction using the document importer 112. For example, document images with dimensions of X pixels by Y pixels by Z channels can be formatted to a specific size for use by the document extractor device 102.

At step 208, the document extractor device 102 extracts tables, fields of interest, barcodes, or any combination thereof, from the prepared document of step 206. The model prediction engine 116 uses the trained neural network to perform the extraction.

Figure 3:
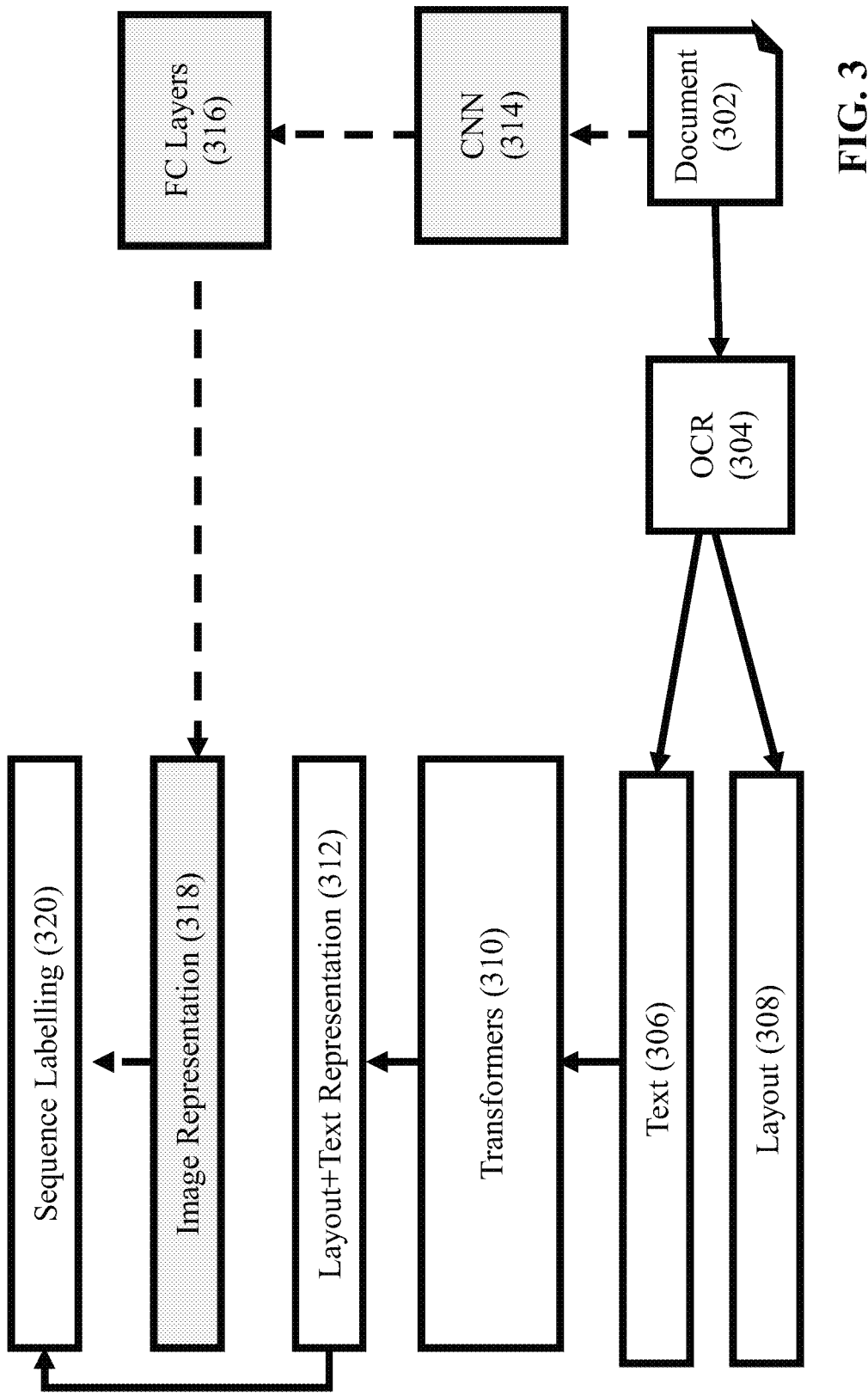
FIG. 3 is a flow diagram showing a process for extracting fields of interest from a document, according to some implementations of the present disclosure.

FIG. 3 is a flow diagram showing a process for extracting fields of interest from a document 302, according to some implementations of the present disclosure. Information extraction is typically seen as a language problem or layout problem. Embodiments of the present disclosure provide an ensemble model which uses a language model with layout features and a vision model with language features. Semantic enrichment is performed in parallel with data preparation for vision model. For example, semantic enrichment allows highlighting labels of the fields in the document 302. The trained model can be trained with a small number of documents, e.g., about 100 documents, and can generalize to documents or document layouts not previously introduced to the model. In some implementations, multi-line text can be extracted (e.g., an address). In some implementations, the client device 104 can be used to view specific candidates selected for extraction within the document, and the user of the client device 104 can review the extracted document with a click and select.

In FIG. 3, the document 302 is fed into a CNN 314 and then to fully connected (FC) layers 316. The FC layers 316 provide an image representation 318 of the document 302. This path represents the visual processing or vision modeling side for extracting fields of interest. In parallel, OCR 304 is performed on the document 302 to obtain text 306 and layout 308 information. Layout 308 information may include coordinates where the text 306 was recognized. In some implementations, layout 308 information includes distance positioning on the page relative to other text on the page, for example, distance from text positioned above the text 306, distance from text positioned below the text 306, distance from text left of the text 306, and/or distance from text right of the test 306. Layout 308 information can help identify fields of interest in tables, and when layout 308 information includes relative distances from surrounding text, column and/or row labels proximate to the text 306 can be recognized.

The text 306 and layout 308 are combined using transformers 310 to obtain layout+text representation 312. In some implementations, the text 306 and the layout 308 information can be represented as multi-dimensional vectors. For example, the text 306 can be represented as a word embedding with a sequence length of 512. The layout 308 information can be represented as position embedding, coordinate embedding, distance embedding to nearest texts and distance to label embedding. The different embeddings of the text 306 and the layout 308 information can then be added together and passed to the transformers 310. Examples of the transformers 310 include Bidirectional Encoder Representations from Transformers (BERT) and PyTorch-Transformers models for natural language processing (NLP). Transformers used for NLP can be used to determine likelihoods that a given word follows another word (e.g., NLP can be used to determine patterns and sequences for understanding context surrounding the text 306). The layout+text representation 312 obtained from the transformers 310 is a multi-dimensional vector.

The layout+text representation 312 and the image representation 318 are combined to provide sequence labeling 320. The process of sequence labeling 320 involves assigning sequence text to different categories of fields of interest. For example, fields of interest in a document may include invoice number, invoice date, etc., and the sequence labeling 320 links appropriate text extracted from the document to the different fields of interest.

Figure 4:
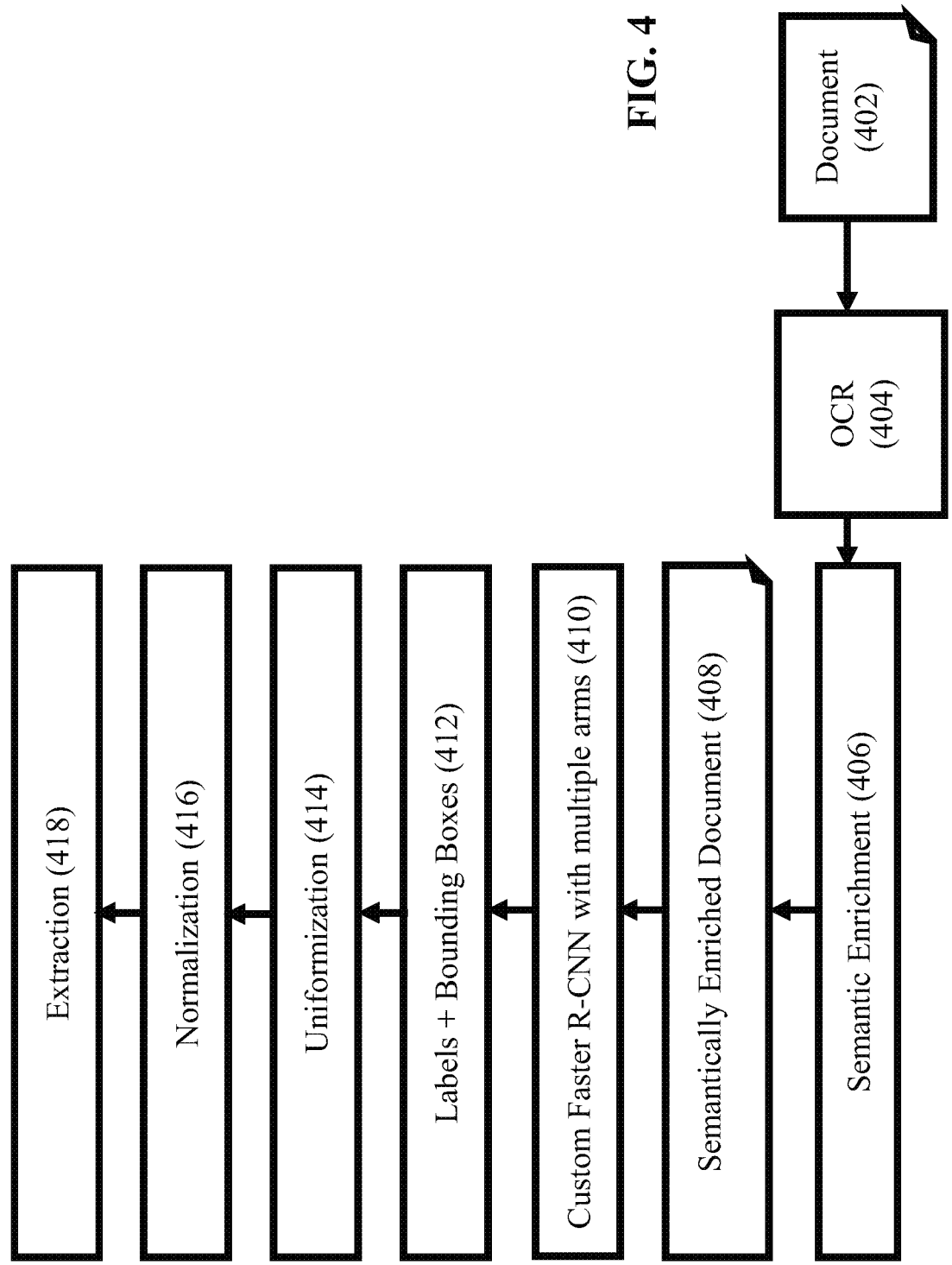
FIG. 4 is a flow diagram showing a process for table extraction from a document, according to some implementations of the present disclosure.

FIG. 4 is a flow diagram showing a process for table extraction from a document 402, according to some implementations of the present disclosure. OCR 404 is used on the document 402, and semantic enrichment 406 is applied to obtain a semantically enriched document 408. The semantically enriched document 408 is fed into a custom faster R-CNN 410. The R-CNN 410 provides locations of labels and bounding boxes 412. Afterwards, uniformization 414, normalization 416, and extraction 418 are performed. Uniformization 414 is performed to bring all the columns y1 and y2 to the corresponding y1 and y2 position of the table. Uniformization 414 uses a median and brings the x1 of first column to x1 position of the table and x2 of last column to x2 of the table. Normalization 416 is performed to normalize separators of each column of the table. The separators come from at least two different columns' bounding boxes. Extraction 418 involves extracting text from within the boundaries of the table using the coordinates of the table and OCR.

Figure 5:
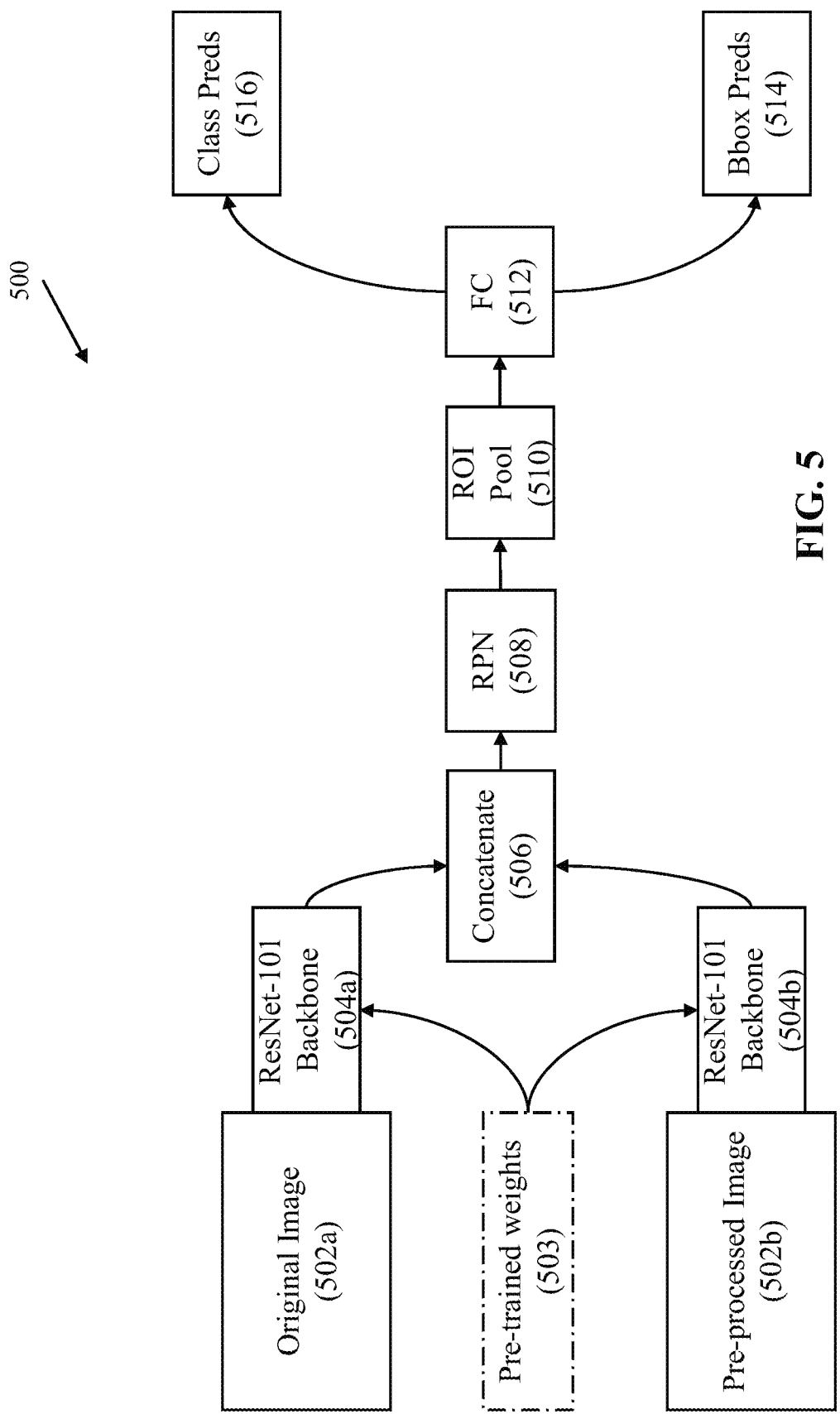
FIG. 5 is an architecture of a region proposal network using convolutional neural network, according to some implementations of the present disclosure.
Figure 6B:
FIG. 6B is an example invoice with a table with identified row separators.
Figure 6E:
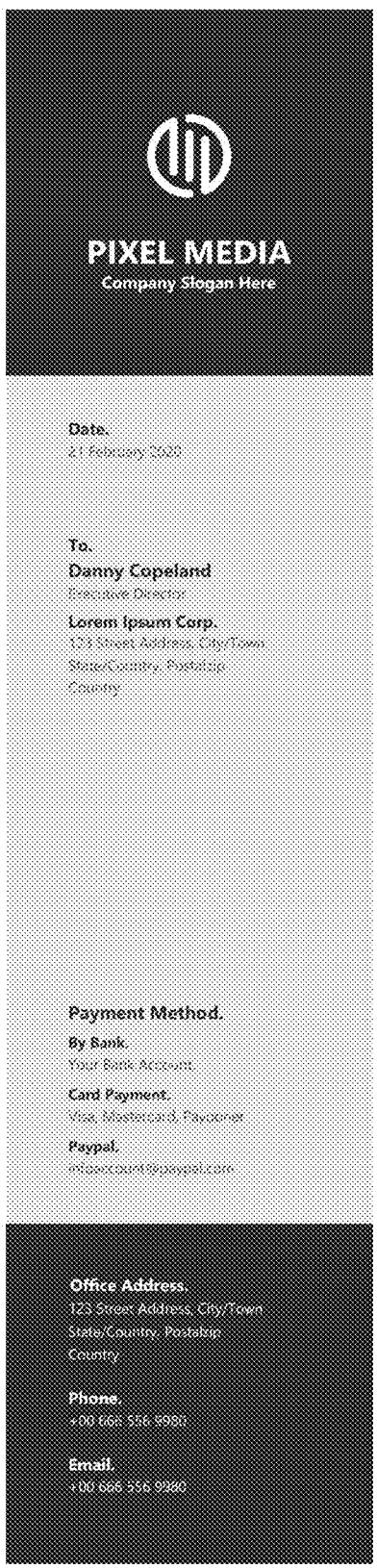
FIG. 6E is an example invoice with a table without column boundaries.
Figure 7A:
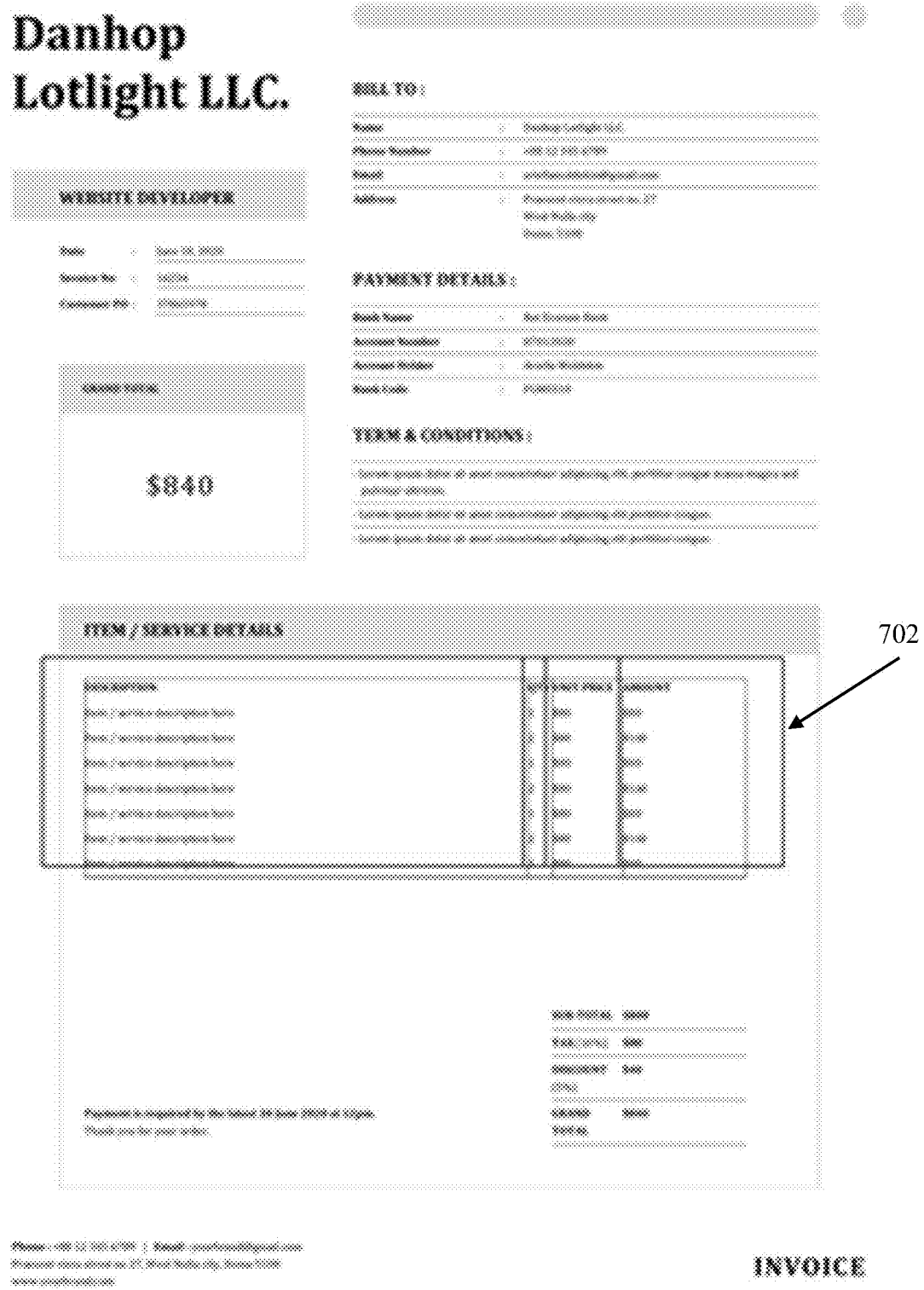
FIG. 7A is the example invoice of FIG. 6A with the table identified.
Figure 7E:
FIG. 7E is the example invoice of FIG. 6E with the table identified.

FIG. 5 is an architecture of a custom faster R-CNN model 500, according to some implementations of the present disclosure. The ResNet-101 504a and 504b are used as backbones of the R-CNN model 500. ResNet-101 is merely used as an example, any other CNN backbone for image classification can be used (e.g., AlexNet, VGG, etc.). The R-CNN model 500 receives an original image 502a and a pre-processed image 502b at the ResNet-101 backbones 504a and 504b, respectfully. The ResNet-101 backbones 504a and 504b are loaded with pre-trained weights 503. In some implementations, the pre-trained weights 503 are readily available in software packages that implement ResNet-101. The original image 502a is an image of the document (e.g., the document 402 of FIG. 4), and the pre-processed image 502b is a context-aware image (e.g., the semantically enriched document 408 of FIG. 4).

Output from the ResNet-101 backbones 504a and 504b are concatenated using concatenate block 506. In some implementations, the concatenate block 506 performs 1×1 convolutions. The output of the concatenate block 506 is fed into a region proposal network (RPN) 508. The RPN 508 is a neural network layer that proposes boxes around features of interest. The RPN 508 can be thought of as network layers that provide bounding boxes around items of interest in the document image. A region of interest (ROI) pool 510 is used to match dimensions of the different region proposals of the RPN 508 to an FC layer 512. The FC layer 512 can then predict a class (class preds 516) for the pooled region or can predict boundaries (bbox preds 514) for the pooled region. In an example, if the pooled region includes a table, the class preds 516 can classify the pooled region as a table and the bbox preds 514 can indicate the size of the table.

To illustrate some advantages of some implementations of the present disclosure, an example is discussed herein. In the example, image preprocessing is used to provide context awareness and deep learning is used for information extraction. In a first step, example image preprocessing is applied to enrich images to provide context awareness, and in a second step, the R-CNN model 500 is trained for end-to-end table detection and extraction.

In the first step, context awareness can be achieved by mapping and transferring images similar to the input image to predict the coordinates of the region. The other option is to create a mapping which is common across all the input images to differentiate regions to identify potential locations and scales. Tables will normally represent information of multiple data types in a row column fashion. Each column can pertain to a specific data type like text, currency, number, decimal, country code, etc. In a closed domain context, like in intelligent document processing, which deals with specific document types, the liberty of utilizing header information is also possible. Context awareness was provided to the images using image preprocessing which involved converting the images to text using OCR and highlighting the column header and other data type based columns in different colors. In an open domain context, the header separated by line above text block is highlighted with repeated common data types for multiple lines, based on (x, y) position. The labels can be created by manually annotating the training images for table and column classes.

The dataset was augmented by replacing the values in the image with identification of data types used for context awareness and other image augmentation techniques (e.g., rotation, scaling, adding noise, translating, etc.).

In the second step, the R-CNN model 500 is trained. Given a set of images I and a set of classes C, an object detection algorithm tries to identify, for all i∈I and c∈C, an $f(c|i)=p(c|i)$. c is the hypothesis space to infer and i is the image space for inputs. $f(c|i)=p(c|i)$ is the objective function of the detection algorithms, where p is the probability calculated by the softmax output of the objective detection algorithm. In the present example, for an image i∈I, there will be $C^{[2]}$ classes and $C_4^{[2]}$ coordinates. That is, a class c is predicted using objective function $f$ where p is the probability of the softmax output and regresses bounding box coordinates $[c_x, c_y, c_w, c_h]$. $c_x$ and $c_y$ provide coordinates for the bounding box, and $c_w$ and $c_h$ provide width and height, respectively, of the bounding box. The FC layer 512 provides class preds 516 as c and bbox preds 514 as $[c_x, c_y, c_w, c_h]$.

In training the R-CNN model 500, the training dataset included actual images with dimensions of 416×416×3 and contextualized (or transformed) images with dimensions of 416×416×3. Each image in the training dataset is annotated with bounding boxes for two classes—a class for table, and a class for column. The training dataset contained 100 unique samples of private invoice and purchase order documents. Hardware infrastructure used for training included an 8-core processor, 16 GB RAM (random access memory), and 8 GB Tesla K80 GPU (graphics processing unit).

Training was performed for 4,000 iterations with validation data performance being checked for overfitting. The training was performed in 3 steps, with the first 1000 iterations as Faster R-CNN detector for the input image arm, the second 1000 iterations as Faster R-CNN detector for the transformed image arm, and the last 2000 iterations with both of the arms concatenated. Validation was performed every 500 iterations. The base learning rate was set as 0.001.

Testing was performed, and class probabilities above 0.7 are considered for evaluation of test data. Test results were compared against results obtained from other methods for extracting documents (e.g., Camelot, Tabula, etc.). Extraction was performed by converting the image to text. The extracted text is converted to JSON based on bounding boxes and compared to the ground truth for 500 images, with and without tables, in various domains.

FIGS. 6A-6E provide example source invoices with different types of tables for table extraction using some implementations of the present disclosure. Corresponding images of identified tables in each of the source images of FIGS. 6A-6E are provided in FIGS. 7A-7E, respectively. In FIGS. 7A-7E, the extracted tables are identified as 702, 712, 722, 732, and 742. The R-CNN model 500 was able to accurately predict tables and column boundaries from various images across different domains. Images with different sized tables and with tables with/without row borders, with/without column borders and no borders were identified. Tables 1 and 2 provide metrics comparing the R-CNN model 500 against other methods. Table 1 is directed at table detection, and Table 2 is directed at table extraction.

TABLE 1

Table Detection (with OCR Issue Included)

| Model | Average Precision | Average Recall | Average F1-score |
|---|---|---|---|
| R-CNN model 500 | 1 | 0.7971 | 0.8793 |
| Faster R-CNN with input image alone | 0.97 | 0.7249 | 0.8129 |
| Faster R-CNN with transformed image alone | 0.98 | 0.7561 | 0.8327 |
| Camelot | 0.69 | 0.6279 | 0.6349 |
| Tabula | 0.73 | 0.6643 | 0.6742 |

TABLE 2

Table Extraction (with OCR issues included)

| Model | Average Precision | Average Recall | Average F1-score |
|---|---|---|---|
| R-CNN model 500 | 0.96 | 0.8196 | 0.8646 |
| Faster R-CNN with input image alone | 0.88 | 0.6326 | 0.7216 |
| Faster R-CNN with transformed image alone | 0.91 | 0.7035 | 0.7645 |
| Camelot | 0.55 | 0.3698 | 0.4065 |
| Tabula | 0.52 | 0.284 | 0.3571 |

Metrics in Tables 1 and 2 were calculated using precision, recall and F1-scores. In the intelligent document processing space, metrics are not provided on first removing noisy documents and then having predictions with only high confidence scores. The quoted metrics include all images with good/bad OCR, small/medium/large font, dark background, etc. The metrics present include bad OCR text. The ground truth was created manually from the table images irrespective of the state of the images. After prediction, Tesseract was used to extract the text predicted by the model's table structure and calculated the Precision, Recall and F1-score for each document. This exercise was repeated for the Tabula, Camelot, predictions from the source image part in the R-CNN model 500 architecture and with predictions from the preprocessed image part in the R-CNN model 500 architecture.

Referring to Tables 1 and 2, the R-CNN model 500 performed best across all the documents. The cloud providers' information extraction engines offering similar features performed more poorly. Results were achieved that were close to state-of-the-art results in Marmot dataset for documents with confidence score greater than 95%. The metrics for table detection are provided under Table 1, and metrics for table extraction are provided under Table 2.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The computing device as mentioned in the application can include a set of instructions that can be executed to cause the computer system to perform any one or more of the methods disclosed. The computer system may operate as a stand-alone-device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system can also be implemented as or incorporated across various devices, such as a personal computer (PC), a tablet PC, a personal digital assistant (PDA), a mobile device, a palmtop computer, a laptop computer, a desktop computer, a communications device, a web appliance, a network router, switch or bridge, or any other machine capable of executing a set of instructions (sequential or otherwise) that specify actions to be taken by that machine. Further, while a single computer system is illustrated, the term "system" shall also be taken to include any collection of systems or sub-systems that individually or jointly execute a set, or multiple sets, of instructions to perform one or more computer functions.

The network as referred in the application may include wired networks, wireless networks, Ethernet AVB networks, or combinations thereof. The wireless network may be a cellular telephone network, an 802.11, 802.16, 802.20, 802.1Q or WiMax network. Further, the network may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

Figure 8:
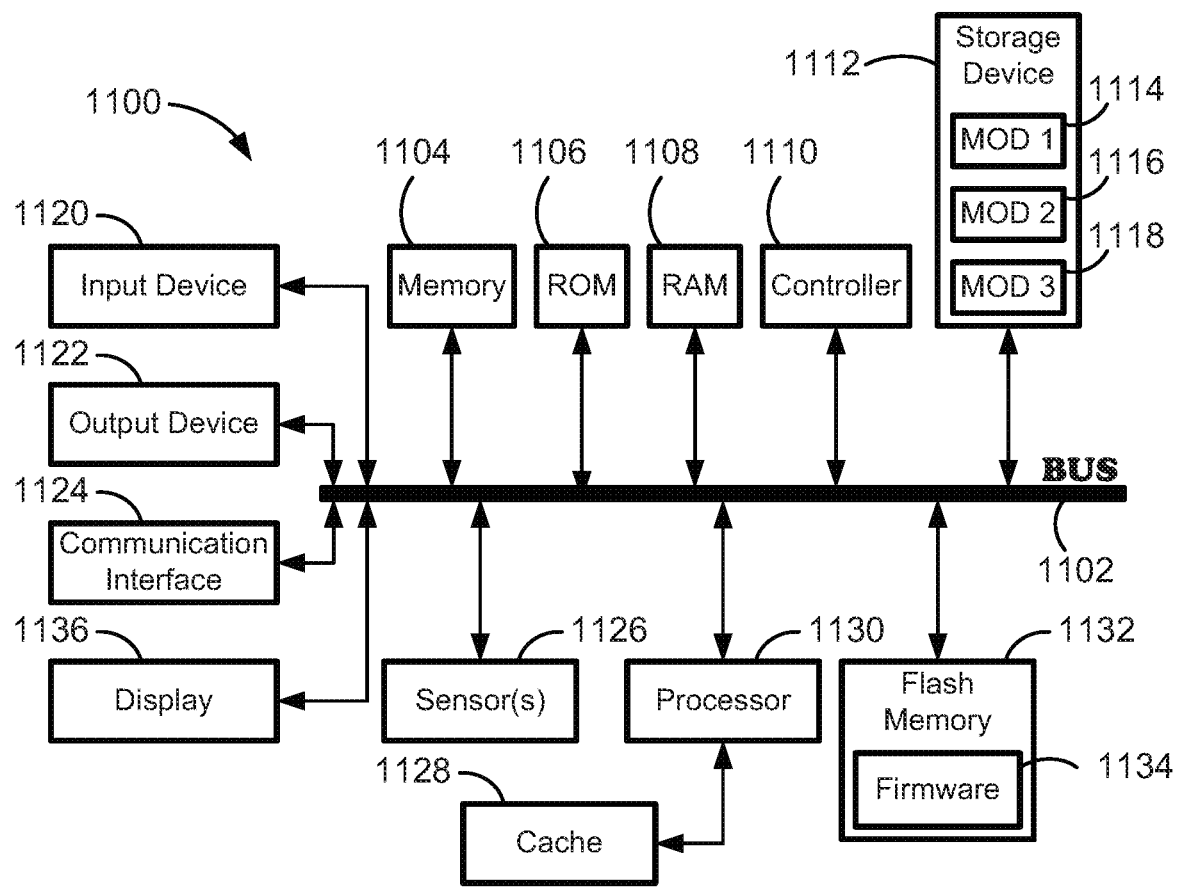
FIG. 8 illustrates an example computer system.

FIG. 8 illustrates an example computing system 1100, in which the components of the computing system are in electrical communication with each other using a bus 1102.

The system 1100 includes a processing unit (CPU or processor) 1130, and a system bus 1102 that couples various system components, including the system memory 1104 (e.g., read only memory (ROM) 1106 and random access memory (RAM) 1108), to the processor 1130. The system 1100 can include a cache of high-speed memory connected directly with, in close proximity to, or integrated as part of the processor 1130. The system 1100 can copy data from the memory 1104 and/or the storage device 1112 to the cache 1128 for quick access by the processor 1130. In this way, the cache can provide a performance boost for processor 1130 while waiting for data. These and other modules can control or be configured to control the processor 1130 to perform various actions. Other system memory 1104 may be available for use as well. The memory 1104 can include multiple different types of memory with different performance characteristics. The processor 1130 can include any general purpose processor and a hardware module or software module, such as module 1 1114, module 2 1116, and module 3 1118 embedded in storage device 1112. The hardware module or software module is configured to control the processor 1130, as well as a special-purpose processor where software instructions are incorporated into the actual processor design. The processor 1130 may essentially be a completely self-contained computing system, containing multiple cores or processors, a bus, memory controller, cache, etc. A multi-core processor may be symmetric or asymmetric.

To enable user interaction with the computing device 1100, an input device 1120 is provided as an input mechanism. The input device 1120 can comprise a microphone for speech, a touch-sensitive screen for gesture or graphical input, keyboard, mouse, motion input, and so forth. In some instances, multimodal systems can enable a user to provide multiple types of input to communicate with the system 1100. In this example, an output device 1122 is also provided. The communications interface 1124 can govern and manage the user input and system output.

Storage device 1112 can be a non-volatile memory to store data that are accessible by a computer. The storage device 1112 can be magnetic cassettes, flash memory cards, solid state memory devices, digital versatile disks, cartridges, random access memories (RAMs) 1208, read only memory (ROM) 1106, and hybrids thereof.

The controller 1110 can be a specialized microcontroller or processor on the system 1100, such as a BMC (baseboard management controller). In some cases, the controller 1110 can be part of an Intelligent Platform Management Interface (IPMI). Moreover, in some cases, the controller 1110 can be embedded on a motherboard or main circuit board of the system 1100. The controller 1110 can manage the interface between system management software and platform hardware. The controller 1110 can also communicate with various system devices and components (internal and/or external), such as controllers or peripheral components, as further described below.

The controller 1110 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 1110 can also include a system event log controller and/or storage for managing and maintaining events, alerts, and notifications received by the controller 1110. For example, the controller 1110 or a system event log controller can receive alerts or notifications from one or more devices and components, and maintain the alerts or notifications in a system event log storage component.

Flash memory 1132 can be an electronic non-volatile computer storage medium or chip that can be used by the system 1100 for storage and/or data transfer. The flash memory 1132 can be electrically erased and/or reprogrammed. Flash memory 1132 can include EPROM (erasable programmable read-only memory), EEPROM (electrically erasable programmable read-only memory), ROM, NVRAM, or CMOS (complementary metal-oxide semiconductor), for example. The flash memory 1132 can store the firmware 1134 executed by the system 1100 when the system 1100 is first powered on, along with a set of configurations specified for the firmware 1134. The flash memory 1132 can also store configurations used by the firmware 1134.

The firmware 1134 can include a Basic Input/Output System or equivalents, such as an EFI (Extensible Firmware Interface) or UEFI (Unified Extensible Firmware Interface). The firmware 1134 can be loaded and executed as a sequence program each time the system 1100 is started. The firmware 1134 can recognize, initialize, and test hardware present in the system 1200 based on the set of configurations. The firmware 1134 can perform a self-test, such as a POST (Power-on-Self-Test), on the system 1100. This self-test can test the functionality of various hardware components such as hard disk drives, optical reading devices, cooling devices, memory modules, expansion cards, and the like. The firmware 1134 can address and allocate an area in the memory 1104, ROM 1106, RAM 1108, and/or storage device 1112, to store an operating system (OS). The firmware 1134 can load a boot loader and/or OS, and give control of the system 1100 to the OS.

The firmware 1134 of the system 1100 can include a firmware configuration that defines how the firmware 1134 controls various hardware components in the system 1200. The firmware configuration can determine the order in which the various hardware components in the system 1100 are started. The firmware 1134 can provide an interface, such as an UEFI, that allows a variety of different parameters to be set, which can be different from parameters in a firmware default configuration. For example, a user (e.g., an administrator) can use the firmware 1134 to specify clock and bus speeds; define what peripherals are attached to the system 1100; set monitoring of health (e.g., fan speeds and CPU temperature limits); and/or provide a variety of other parameters that affect overall performance and power usage of the system 1100. While firmware 1134 is illustrated as being stored in the flash memory 1132, one of ordinary skill in the art will readily recognize that the firmware 1234 can be stored in other memory components, such as memory 1104 or ROM 1106.

System 1100 can include one or more sensors 1126. The one or more sensors 1126 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1126 can communicate with the processor, cache 1128, flash memory 1132, communications interface 1124, memory 1104, ROM 1106, RAM 1108, controller 1110, and storage device 1112, via the bus 1102, for example. The one or more sensors 1126 can also communicate with other components in the system via one or more different means, such as inter-integrated circuit (I2C), general purpose output (GPO), and the like. Different types of sensors (e.g., sensors 1126) on the system 1100 can also report to the controller 1110 on parameters, such as cooling fan speeds, power status, operating system (OS) status, hardware status, and so forth. A display 1136 may be used by the 1100 to provide graphics related to the applications that are executed by the controller 1110, or the processor 1130.

Figure 9:
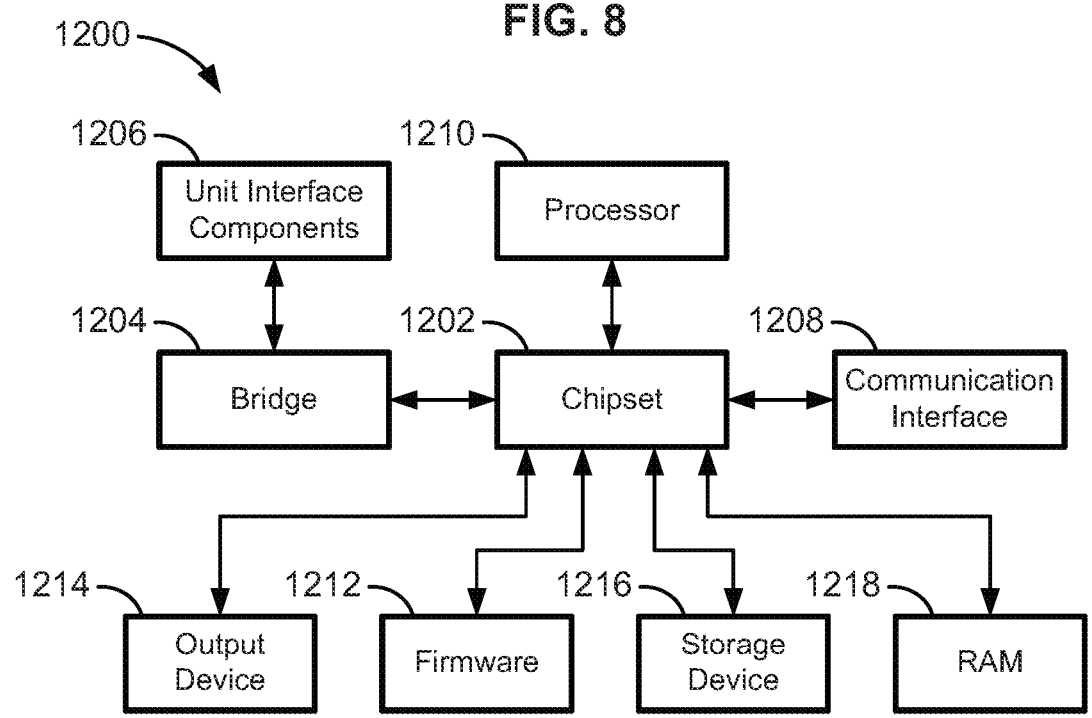
FIG. 9 illustrates an example computer system.

FIG. 9 illustrates an example computer system 1200 having a chipset architecture that can be used in executing the described method(s) or operations, and generating and displaying a graphical user interface (GUI). Computer system 1200 can include computer hardware, software, and firmware that can be used to implement the disclosed technology. System 1200 can include a processor 1210, representative of a variety of physically and/or logically distinct resources capable of executing software, firmware, and hardware configured to perform identified computations. Processor 1210 can communicate with a chipset 1202 that can control input to and output from processor 1210. In this example, chipset 1202 outputs information to output device 1214, such as a display, and can read and write information to storage device 1216. The storage device 1216 can include magnetic media, and solid state media, for example. Chipset 1202 can also read data from and write data to RAM 1218. A bridge 1204 for interfacing with a variety of user interface components 1206, can be provided for interfacing with chipset 1202. User interface components 1206 can include a keyboard, a microphone, touch detection and processing circuitry, and a pointing device, such as a mouse.

Chipset 1202 can also interface with one or more communication interfaces 1208 that can have different physical interfaces. Such communication interfaces can include interfaces for wired and wireless local area networks, for broadband wireless networks, and for personal area networks. Further, the machine can receive inputs from a user via user interface components 1206, and execute appropriate functions, such as browsing functions by interpreting these inputs using processor 1210.

Moreover, chipset 1202 can also communicate with firmware 1212, which can be executed by the computer system 1200 when powering on. The firmware 1212 can recognize, initialize, and test hardware present in the computer system 1300 based on a set of firmware configurations. The firmware 1212 can perform a self-test, such as a POST, on the system 1200. The self-test can test the functionality of the various hardware components 1202-1218. The firmware 1212 can address and allocate an area in the RAM memory 1218 to store an OS. The firmware 1212 can load a boot loader and/or OS, and give control of the system 1200 to the OS. In some cases, the firmware 1212 can communicate with the hardware components 1202-1210 and 1214-1218. Here, the firmware 1212 can communicate with the hardware components 1202-1210 and 1214-1218 through the chipset 1202, and/or through one or more other components. In some cases, the firmware 1212 can communicate directly with the hardware components 1202-1210 and 1214-1218.

It can be appreciated that example systems 1100 and 1200 can have more than one processor (e.g., 1130, 1210), or be part of a group or cluster of computing devices networked together to provide greater processing capability.

Embodiments of the present disclosure provide a deep-learning model based on object detection and localization networks that are applied on document images to detect and localize table, columns and rows from images. The model is trained using a small number of training samples so as to avoid the constraint of collecting thousands of images. Collecting thousands of images that fit a certain criteria may not always be possible when considering using applications that involve multiple document types or styles. Embodiments of the present disclosure use image enrichment as a pre-processing technique and apply transfer learning by fine-tuning a pre-trained model from Faster R-CNN. A unified table detection and table structure recognition is realized for document images.

Embodiments of the present disclosure takes the pre-processed enriched image and produces semantically segmented labels and bounding boxes for tables and columns. The image enrichment is done to provide context awareness to the object detection for both tables and columns. In an example, the deep-learning model's performance is evaluated using 500 images after training on 100 images. The evaluation target had samples that were hugely dissimilar from the source images (i.e., the training data set). The model has also generalized to other domains like legal documents and finance documents, with minimal fine-tuning using a smaller set of documents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

I claim:

1. A system to extract data from regions of interest on a document, the system comprising:
    a storage device storing an image derived from a document having text information;
    a document importer operable to perform optical character recognition to convert image data in the image to machine readable data; and a neural network that identifies at least one region of interest on the image to classify an area of the at least one region of interest as a table or column, the neural network taking in as input the machine readable data and the image and combining both the machine readable data and the image to determine that the classified area is the table or column,
wherein the neural network includes:
a first convolutional neural network backbone configured to process the machine readable data,
a second convolutional neural network backbone configured to process the image,
a region proposal network configured to determine the at least one region of interest, and
a region of interest pool layer configured to match dimensionality of the region proposal network and a fully connected layer,
the fully connected layer configured to classify the area as the table or column.

2. The system of claim 1, wherein the neural network further includes a 1×1 convolution that combines outputs of the first and the second convolutional neural network backbones.

3. The system of claim 1, wherein the first and the second convolutional neural network backbones include a VGG backbone, an AlexNet backbone, or a ResNet backbone.

4. The system of claim 1, wherein the first and the second convolutional neural network are initialized with pre-trained weights of a ResNet-101 backbone.

5. The system of claim 1, wherein the image is obtained from a scanner or a photograph of the document.

6. The system of claim 1, wherein the neural network further classifies a second area of the at least one region of interest as a column.

7. The system of claim 1, wherein the neural network predicts a bounding box for the area classified as the table.

8. The system of claim 1, wherein the fully connected layer is further configured to indicate size of the table or column.

9. The system of claim 1, further comprising:
an extractor configured to parse text from the machine readable data, the parsed text corresponding to text within the classified area.

10. A method of extracting data from regions of interest from a document, the method comprising:
retrieving from a storage device an image of the document;
converting the image to machine readable data using optical character recognition of a data importer;
combining the machine readable data and the image using a neural network, the neural network including a first convolutional neural network backbone to process the machine readable data and a second convolutional neural network backbone to process the image;
identifying, by a region proposal network of the neural network, at least one region of interest on the image using the combined machine readable data and image; and
classifying, using a fully connected layer of the neural network, an area of the at least one region of interest as a table or a column, the neural network further including a region of interest pool layer for matching dimensionality of the region proposal network and the fully connected layer.

11. The method of claim 10, wherein the neural network further includes a 1×1 convolution that combines outputs of the first and the second convolutional neural network backbones.

12. The method of claim 10, wherein the first and the second convolutional neural network backbones include a VGG backbone, an AlexNet backbone, or a ResNet backbone.

13. The method of claim 10, further comprising:
initializing the first and the second convolutional neural network with pre-trained weights of a ResNet-101 backbone.

14. The method of claim 10, wherein the image is obtained from a scanner or a photograph of the document.

15. The method of claim 10, further comprising:
classifying, by the neural network, a second area of the at least one region of interest as a column.

16. The method of claim 10, further comprising indicating, using the fully connected layer of the neural network, a size of the table or column.

17. The method of claim 10, further comprising extracting parsed text from the machine readable data, the parsed text corresponding to text within the classified area.

18. A system to extract data from regions of interest on a document, the system comprising:
a storage device storing an image derived from a document having text information;
a document importer operable to
perform optical character recognition to convert image data in the image to machine readable data, and
perform semantic enrichment on the machine readable data to obtain a semantically enriched document, the semantic enrichment involving extracting labels of fields from the machine readable data; and
a neural network including a first convolutional neural network, a second convolutional neural network, and a fully connected layer, the neural network operable to:
preprocess the semantically enriched document using the first convolutional neural network;
preprocess the image using the second convolutional neural network;
concatenate outputs of the first convolutional neural network and the second convolutional neural network;
identify, from the concatenated outputs, at least one region of interest on the image using the combined machine readable data and image; and
classify an area of the at least one region of interest as a table using the fully connected layer of the neural network.

19. The method of claim 18, wherein the neural network is further operable to indicate size of the table or column.

20. The system of claim 18, further comprising:
an extractor configured to parse text from the machine readable data, the parsed text corresponding to text within the classified area.

* * * * *